United States Patent
Maruyama et al.

(10) Patent No.: US 8,591,375 B2
(45) Date of Patent: Nov. 26, 2013

(54) CLUTCH DEVICE

(75) Inventors: Atsushi Maruyama, Tochigi (JP);
Toshiaki Komatsu, Tochigi (JP);
Noriyuki Sudou, Tochigi (JP); Masaaki Fusegi, Tochigi (JP); Hiroyasu Furukawa, Tochigi (JP)

(73) Assignee: GKN Driveline Japan Ltd., Tochigi (JP)

( * ) Notice: Subject to any disclaimer, the term of this patent is extended or adjusted under 35 U.S.C. 154(b) by 263 days.

(21) Appl. No.: 12/917,272

(22) Filed: Nov. 1, 2010

(65) Prior Publication Data
US 2011/0105264 A1    May 5, 2011

(30) Foreign Application Priority Data

Nov. 4, 2009  (JP) ................................ 2009-252718
Dec. 10, 2009  (JP) ................................ 2009-280448

(51) Int. Cl.
*F16H 48/06*    (2006.01)
*F16H 48/20*    (2012.01)
*F16H 48/12*    (2012.01)
*F16D 19/00*    (2006.01)

(52) U.S. Cl.
USPC ... 475/231; 475/220; 192/84.961; 192/84.92; 74/650

(58) Field of Classification Search
USPC ......................................................... 475/231
See application file for complete search history.

(56) References Cited

U.S. PATENT DOCUMENTS

| 6,945,895 B2* | 9/2005 | Fusegi et al. .................. 475/150 |
| 7,074,150 B2* | 7/2006 | Fusegi et al. .................. 475/150 |
| 2007/0054771 A1* | 3/2007 | Fusegi .......................... 475/231 |
| 2007/0179008 A1 | 8/2007 | Fusegi et al. |
| 2008/0009381 A1* | 1/2008 | Sudou et al. .................. 475/231 |
| 2010/0056314 A1 | 3/2010 | Maruyama et al. |

FOREIGN PATENT DOCUMENTS

| JP | 2007-092990 A | 4/2007 |
| JP | 2007-315583 A | 12/2007 |

* cited by examiner

*Primary Examiner* — David D Le
*Assistant Examiner* — Colby M Hansen
(74) *Attorney, Agent, or Firm* — Morrison & Foerster LLP (57) ABSTRACT

A clutch device is used in combination with a differential device. The clutch device is comprised of: a clutch housed in and rotatable with the differential device and axially movable from a disengaged state into an engaged state; a plunger slidably fit on the differential device and being axially movable from a first position where the plunger does not force the clutch to a second position where the plunger forces the clutch into the engaged state; an anti-rotated solenoid configured to drive the plunger; and a retainer supported by the differential device and in contact with both the plunger at the first position and the solenoid, whereby the plunger is barred from going beyond the first position and the solenoid is axially positioned in place.

12 Claims, 11 Drawing Sheets

CLUTCH DEVICE

CROSS-REFERENCE TO RELATED APPLICATIONS

This application is based upon and claims the benefit of priority from the prior Japanese Patent Applications No. 2009-252718 (filed Nov. 4, 2009) and No. 2009-280448 (filed Dec. 10, 2009); the entire contents of which are incorporated herein by reference.

BACKGROUND OF THE INVENTION

1. Field of the Invention

The present invention relates to a clutch device used in combination with a differential device applied to conveyance means such as automobiles.

2. Description of the Related Art

As is known, an automobile is equipped with one or more differentials, each of which distributes a driving force of an engine to a pair of output axles with allowing differential motion between the axles. Some differentials have proper means for limiting or locking differential motion under proper control, thereby preventing wheels from losing traction with the road even when one of the wheels loses contact with the road. Others have means for controllably transmitting driving force to differential gear sets while the differential gear sets freely run in a steady state. So-called "part-time 4WD" automobiles utilize differentials of the latter type.

A clutch is in general used to embody these means and a plunger and a solenoid is frequently used in combination. While the clutch and the plunger rotate in accordance with rotation of the differential, the solenoid must be held stationary because the solenoid must have electric connection with electric components on the automobile and further bear reaction force in response to actuation of the plunger and the clutch. Even though the plunger and the clutch rotate but the solenoid is stationary, if strict positioning control among these devices is lost, critical energy loss or, in a serious case, malfunction will occur. Thus installation of a clutch, a solenoid and a plunger into a differential and how to put them in place are technical issues.

In general, many supplementary components are necessary to retain a solenoid and a plunger in place while allowing rotation of the differential. Japanese Patent Applications Laid-open No. 2007-92990 and No. 2007-315583 disclose related arts.

SUMMARY OF THE INVENTION

An object of the present invention is to provide a clutch device having a simple structure for retaining a solenoid and related members.

According to a first aspect of the present invention, in a clutch device used in combination with a differential device rotatable about an axis, the clutch device is comprised of: a clutch housed in and rotatable with the differential device and axially movable from a disengaged state into an engaged state; a plunger slidably fit on the differential device and being axially movable from a first position where the plunger does not force the clutch to a second position where the plunger forces the clutch into the engaged state; an anti-rotated solenoid configured to drive the plunger; and a retainer supported by the differential device and in contact with both the plunger at the first position and the solenoid, whereby the plunger is barred from going beyond the first position and the solenoid is axially positioned in place.

According to a second aspect of the present invention, in a clutch device used in combination with a differential device rotatable about an axis, the clutch device is comprised of: a clutch housed in and rotatable with the differential device, the clutch including a first member and a second member engageable with the first member to receive torque from the first member, the first member being axially movable so as to disengageably engage with the second member; a plunger slidably fit on the differential device and being axially movable toward the first member; an anti-rotated solenoid configured to drive the plunger to force the first member engaged with the second member; and a retainer engaged with the differential device and so dimensioned as to have the solenoid positioned in place and bar the plunger from departing away from the solenoid.

According to a third aspect of the present invention, in a differential device for differentially distributing a driving force to first and second axles, the differential device is comprised of: a differential gear set configured to allow differential motion between the first and second axles; a casing rotatable about an axis, the casing housing and being drivingly coupled with the differential gear set; a clutch housed in and rotatable with the casing and axially movable from a disengaged state into an engaged state where the clutch limits the differential motion or transmits torque between the casing and the differential gear set; a plunger slidably fit on the differential device and being axially movable from a first position where the plunger does not force the clutch to a second position where the plunger forces the clutch into the engaged state; an anti-rotated solenoid configured to drive the plunger; and a retainer supported by the differential device and in contact with both the plunger at the first position and the solenoid, whereby the plunger is barred from going beyond the first position and the solenoid is axially positioned in place.

DETAILED DESCRIPTION OF THE PREFERRED EMBODIMENT

Certain embodiments of the present invention will be described hereinafter with reference to the appended drawings. Throughout the specification, claims and the drawings, an axial direction means a direction along an axis of a differential device unless any other particular descriptions are given. In general, lateral directions of FIGS. 1, 4, 7, 9 and 11 are correspondent to axial directions of these devices.

For convenience of explanation, the following descriptions will refer some particular directions such as "left" and "right" depending on the directions shown in the drawings. However, of course, use of the invention is not limited in accordance with these referred directions.

First Embodiment

FIGS. 1, 2, 3A and 3B illustrate a differential device 301 with a clutch device 1 in accordance with a first embodiment of the present invention. In a way of use, the differential device 301 is used to differentially distribute driving force generated by an engine to a pair of axles. The differential device 301 is comprised of a differential casing 3 which receives the driving force to rotate about an axis, and a differential gear set 307 housed in and drivingly coupled with the casing 3. The clutch device 1 used in combination with the differential device 301 is comprised of a clutch 7 for locking differential motion of the differential gear set 307, a movable body 9 with a plunger 31 for actuating the clutch 7, a solenoid 11 for driving the movable body 9, and a retainer 17 secured to the differential casing 3. The retainer 17 is in contact with both the plunger 31 and the solenoid 11, thereby putting these members in place.

Figure 1:
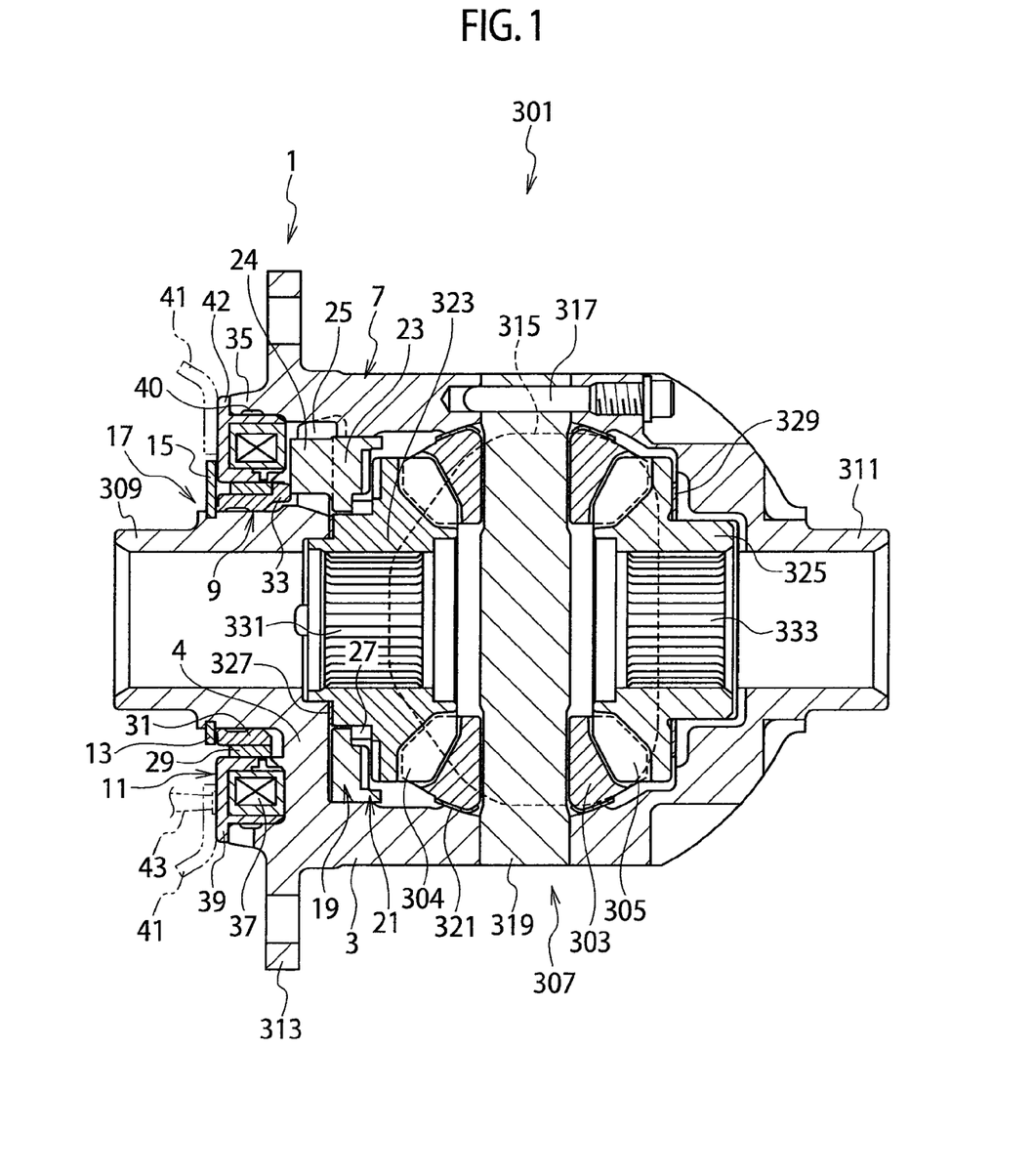
FIG. 1 is an elevational sectional view of a differential device with a clutch device according to a first embodiment of the present invention.

Referring to FIG. 1, the differential casing 3 is drivingly coupled with the differential gear set 307 and therefore the differential gear set 307 along with the differential casing 3 rotates about the axis of the casing 3. The differential casing 3 is in general made up of right and left end walls and a cylindrical side wall, whereby defining a chamber within the walls. The chamber houses the clutch 7, the differential gear set 307, and other related members. The differential casing 3, on its side wall, is further comprised of an opening 315 (drawn in a broken line) for allowing entry of these internal members.

Left and right boss portions 309,311 respectively project out of the right and left end walls in the axial direction, which are to be rotatably supported by bearings of an automobile's body. The left end wall, at its outer periphery, extends leftward to form a collar 35 for receiving the solenoid 11 therein. The collar 35 may have a recess 40, which reduces frictional drag on the stationary solenoid 11 when the differential casing 3 rotates.

The differential casing 3 is further comprised of a flange portion 313 for link with a ring gear (not shown) which receives the driving force of the engine.

The differential gear set 307 is of a bevel gear type generally made up of pinions 303, pinion shafts 319, and a pair of side gears 304 and 305. Instead of the bevel gear type, any of other types such as a helical gear type may be applied to the differential gear set 307.

The pinion shafts 319 are secured to the differential casing 3 by means of pins 317 and rotatably support the pinions 303, thereby allowing rotation of the pinions 303 about the shafts 319 and also driving the pinions 303 to rotate about the axis of the casing 3. Spherical washers 321 may be interposed between the pinions 303 and the casing 3 so as to facilitate rotation.

The side gears 304,305 are respectively comprised of boss portions 323,325 which are rotatably supported by the differential casing 3. The side gears 304,305 respectively have gear teeth engaged with gear teeth of the pinions 303 and splined inner bores 331,333 for drivingly engaging with the axles, thereby transmitting the driving force from the pinions 303 to the axles with allowing differential motion therebetween. The left side gear 304 is furnished with clutch teeth engageable with clutch teeth of a clutch member 19 to form the clutch 7. Thrust washers 327,329 may be interposed between the side gears 303,304 and the casing 3 to facilitate rotation.

The clutch member 19 is slidably housed in the casing and thus movable in the axial direction. The clutch member 19 is comprised of a ring-shaped base portion 23 furnished with the teeth and a plurality of projections 24 projecting leftward from the base portion 23. Correspondingly to the projections 24, the left end wall 4 of the differential casing 3 has openings, through which the projections 24 are exposed to the solenoid 11. A return spring 27 is repulsively interposed between the clutch member 19 and the left side gear 304 so as to force the clutch member 19 away from the side gear 304.

The projections 24 may have oblique side faces and correspondingly the openings of the differential casing 3 may have oblique cam faces 25. Contact of the cam faces 25 on the side faces of the projections 24 makes the clutch member 19 rotate along with the casing 3. Further, contact of these oblique faces forms a cam mechanism to partially convert torque of the casing 3 into axial force which assists engagement of the clutch 7. Alternatively, any or all of these faces may be made straightforward although efficiency of the cam function may be reduced.

The solenoid 11 is comprised of a solenoid coil 37 for generating magnetic flux and a magnetic core 39 for conducting the generated magnetic flux. The solenoid coil 37 is preferably molded in resin. The magnetic core 39 made of a magnetic material is fixed to and skirts the coil 37 but is opened to the right. The solenoid 11 fits in the collar 35 of the differential casing 3 and thus the opened right side of the magnetic core 39 is closed with the left end wall 4. The left end wall 4 along with the magnetic core 39 forms a magnetic circuit surrounding the coil 37 but leaves a gap at its radially inner side. Alternatively, the magnetic core 39 alone may be formed to surround the coil 37 without help of the end wall 4 of the casing 3.

The movable body 9 is comprised of the plunger 31 and an armature 29 engaged therewith, both of which have ring-like forms. The movable body 9 is slidably interposed between the solenoid 11 and the boss portion 309 of the differential casing 3. In particular, the armature 29 is so positioned as to span the aforementioned gap left in the magnetic circuit, thereby closing the magnetic circuit as a loop. Generated magnetic flux passes along this circuit via the armature 29 so that the plunger 31 engaged therewith is driven by the solenoid 11 in the axial direction. While the armature 29 is made of a magnetic material, the plunger 31 may be made of a non-magnetic material such as stainless steel in view of efficiency of magnetic power. Of course if possible, the plunger 31 may be also made of a magnetic material or may be formed in a unitary body with the armature 29.

The plunger 31 is comprised of pressure heads 33 so dimensioned as to abut on the projections 24 of the clutch member 19 through the openings of the end wall 4. Thus the plunger 31 driven by the solenoid 11 moves from the leftmost position to the rightmost position where the plunger 31 forces the clutch 7 into the engaged state.

Figure 2:
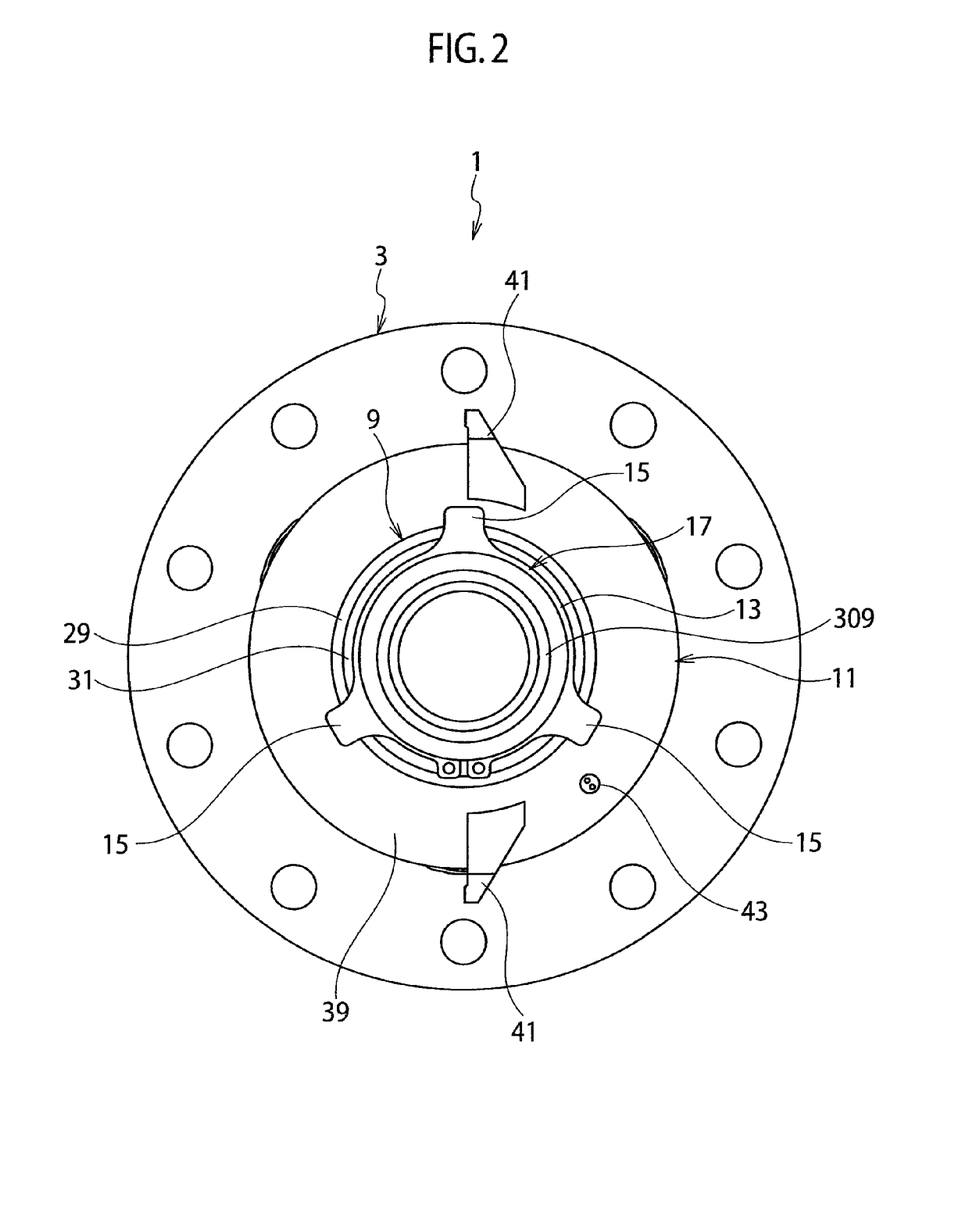
FIG. 2 is a side view of the differential device viewed from the left of FIG. 1.
Figure 3A:
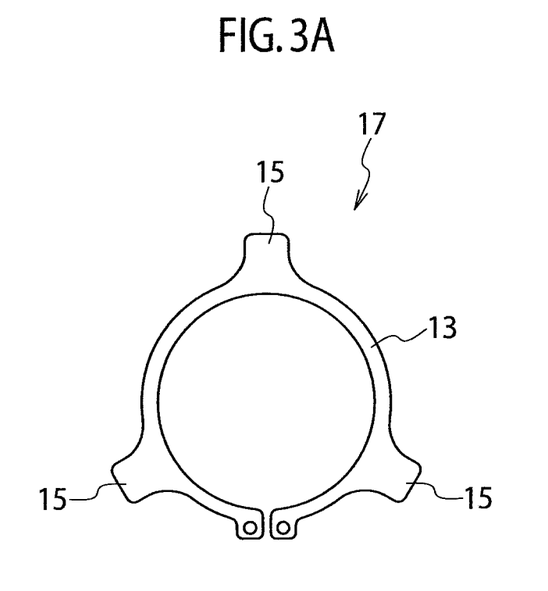
FIG. 3A is a plan view of a retainer applied to the differential device.
Figure 3B:
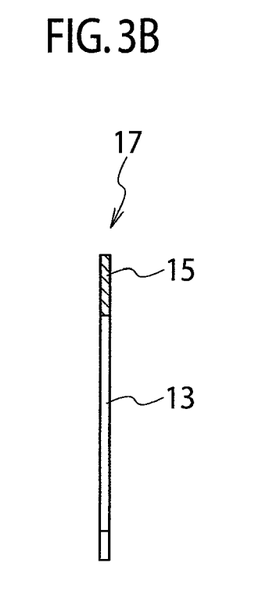
FIG. 3B is a sectional view of the retainer.

The left boss portion 309 on its periphery has a circular groove to which the retainer 17 is secured. Referring to FIGS. 3A and 3B, the retainer 17 is formed in a ring-like shape. Preferably, the retainer 17 is a semi-flexible metal member formed in a ring-like shape having open ends, thereby easily being snapped into the groove of the boss portion 309 as shown in FIG. 2. Alternatively, a retainer of a closed ring can be used and secured to the boss portion 309 by means of any of press-fitting, welding, adhesion, caulking and such.

The ring section 13 of the retainer 17 has enough width to catch the plunger 31. Thus the ring section 13 is in contact with the plunger 31 when the plunger 31 is at the leftmost position. The retainer 17 is further comprised of one or more tab sections 15 projecting radially outward, which have enough height to catch the core 39 of the solenoid 11.

More specifically, the retainer 17 secured to the differential device 301 is in contact with both the plunger 31 at the leftmost position and the solenoid 11, thereby the plunger 31 is barred from going further leftward beyond the leftmost position and the solenoid 11 is axially positioned in place.

Referring to FIG. 2, anti-rotation members 41 secured to the automobile body latch on the core 39, thereby the solenoid 11 is anti-rotated. A lead line 43 is led out of the solenoid 11, through which electric power is supplied to the coil 37 under proper control by a controller.

In the absence of magnetic flux, the plunger 31 is forced leftward by the return spring 27 and thus stays at the leftmost position where the clutch 7 is disengaged. The differential gear set 307 is allowed to do differential motion. When the solenoid 11 is energized, generated magnetic flux passing through the magnetic core 39 drives the plunger 31 to the rightmost position where the plunger 31 abuts on and forces the clutch 7 into the engaged state. Then the differential motion of the differential gear set 307 is locked.

In the clutch device 1, a single unitary member of the retainer 17 puts both the plunger 31 and the solenoid 11 in place. After fitting the solenoid 11 and the moving body 9 in place, only a single step of snapping the retainer 17 into the groove of the boss portion 309 is required to complete installation of these members. Thereafter these members are made integral and therefore easily handled. This is beneficial in view of ease of production and handling.

Moreover, the aforementioned structure provides preciseness in positioning because external members for fixation are not required for positioning of related members. Further, the clutch device 1 is free from vibration transmitted from these external members.

Contact between the retainer 17 and the solenoid 11 is limited at the tab sections 15. This is beneficial in view of heat radiation from the solenoid 11 and smooth rotation of the retainer 17 relative to the solenoid 11.

Second Embodiment

A second embodiment of the present invention will be described hereinafter with reference to FIGS. 4, 5, 6A and 6B. A clutch device 101 is combined with a differential device 301 having substantially the same structure as that of the differential device 301 in accordance with the first embodiment, however, a collar 113 is formed to be somewhat longer and, on the inner periphery thereof, a circular groove for supporting a retainer is provided. Instead, a groove on the boss portion 309 can be omitted. A recess may be formed on the boss portion 309 for the purpose of reduction of frictional drag on a solenoid.

Figure 4:
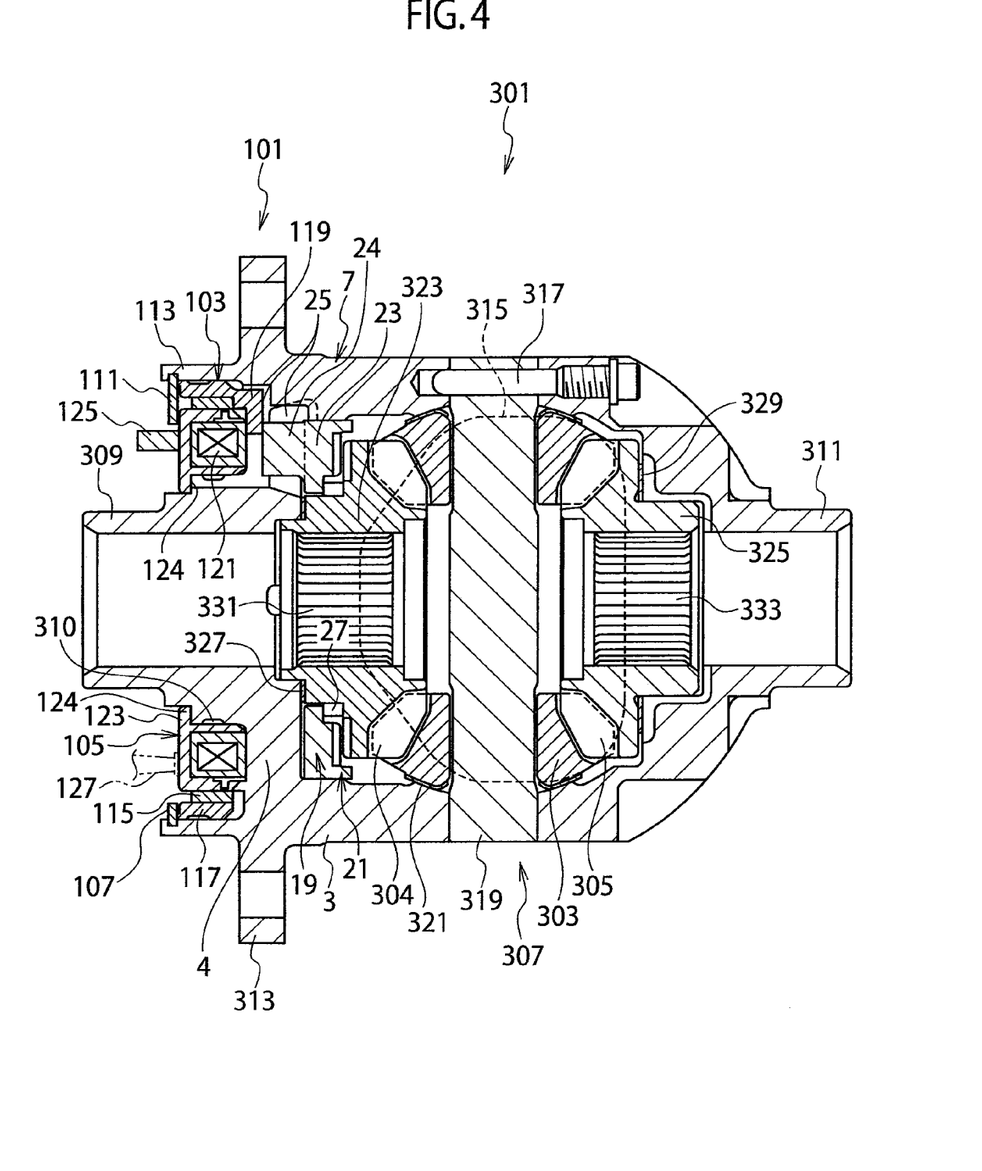
FIG. 4 is an elevational sectional view of a differential device with a clutch device according to a second embodiment of the present invention.

The clutch device 101 is comprised of a clutch 7 for locking differential motion of the differential gear set 307, a movable body 103 with a plunger 117 for actuating the clutch 7, a solenoid 105 for driving the movable body 103, and a retainer 111 secured to the differential casing 3. The retainer 111 is in contact with both the plunger 117 and the solenoid 105, thereby putting these members in place.

The solenoid 105 is comprised of a solenoid coil 121 for generating magnetic flux and a magnetic core 123 for conducting the generated magnetic flux. The solenoid coil 121 is preferably molded in resin. The magnetic core 123 made of a magnetic material, alone or in combination with the left end wall 4 of the differential casing 3, forms a magnetic circuit surrounding the coil 121 but leaves a gap at its radially outer side.

The movable body 103 comprised of the plunger 117 and an armature 115 engaged therewith is slidably interposed between the solenoid 105 and the collar 113 of the differential casing 3. In particular, the armature 115 is so positioned as to span the aforementioned gap left in the magnetic circuit, thereby closing the magnetic circuit as a loop. While the armature 115 is made of a magnetic material, the plunger 117 may be made of a non-magnetic material such as stainless steel.

The plunger 117 is comprised of pressure heads 119 so dimensioned as to abut on the projections 24 of the clutch member 19 through the openings of the end wall 4. Thus the plunger 117 driven by the solenoid 105 moves from the leftmost position to the rightmost position where the plunger 117 forces the clutch 7 into the engaged state.

Figure 6A:
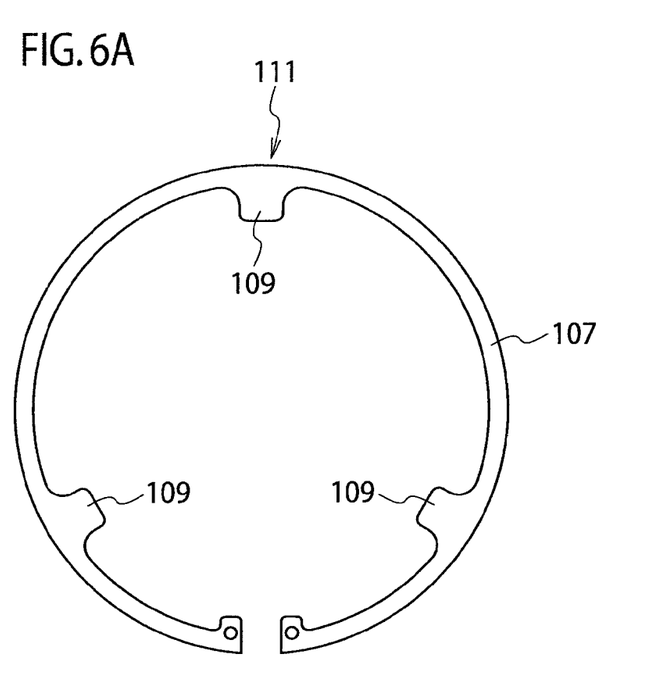
FIG. 6A is a plan view of a retainer applied to the differential device.
Figure 6B:
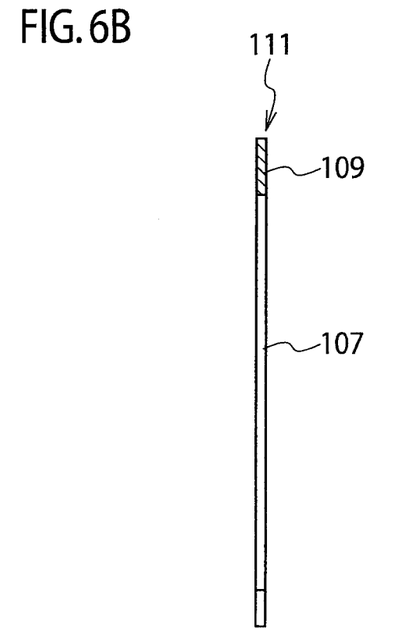
FIG. 6B is a sectional view of the retainer.

Referring to FIGS. 6A and 6B, the retainer 111 is formed in a ring-like shape having open ends and one or more tab sections 109 projecting radially inward. The retainer 111 is snapped into the groove of the collar 113 and thereby secured to the differential casing 3. Then the ring section 107 is made in contact with the plunger 117 and the tab sections 109 are made to catch the core 123 of the solenoid 105. Thus the retainer 111 secured to the differential device 301 is in contact with both the plunger 117 at the leftmost position and the solenoid 105, thereby the plunger 117 is barred from going further leftward beyond the leftmost position and the solenoid 105 is axially positioned in place.

Figure 5:
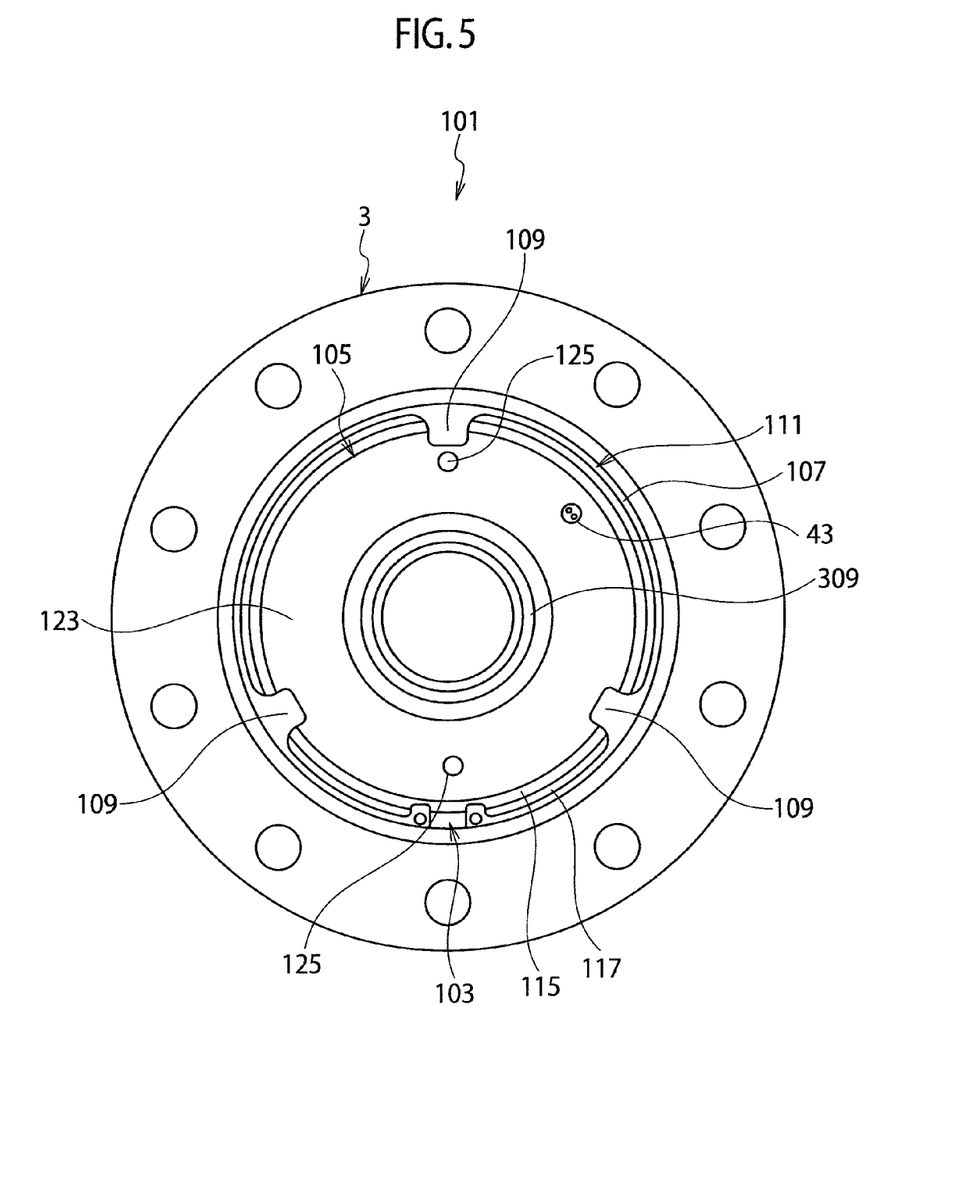
FIG. 5 is a side view of the differential device viewed from the left of FIG. 4.

Referring to FIG. 5, anti-rotation members 125 secured to the automobile body latch on the core 123, thereby the solenoid 105 is anti-rotated. A lead line 43 is led out of the solenoid 105, through which electric power is supplied to the coil 121 under proper control by a controller.

As being understood from the above description, while the plunger 117 stays at the leftmost position in the absence of excitation of the solenoid 105, the excited solenoid 105 drives the plunger 117 to move from the initial position to the rightmost position where the plunger 117 forces the clutch 7 into the engaged state.

Although structurally modified as compared with the clutch device 1 of the first embodiment, the aforementioned clutch device 101 of the second embodiment enjoys the same or similar effects.

Third Embodiment

A third embodiment of the present invention will be described hereinafter with reference to FIGS. 7 and 8. A clutch device 201 is combined with a differential device 301 having substantially the same structure as that of the differential device 301 in accordance with the first embodiment. In the third embodiment, a retainer 207 is comprised of a ring-like plate 208 and a snap ring 209.

The ring-like plate 208 may have one or more openings 210 which reduce contact area with the solenoid 11. These openings are beneficial in view of promotion of heat radiation from the solenoid 11 and may prevent the plate 208 from sticking to the solenoid 11.

Figure 7:
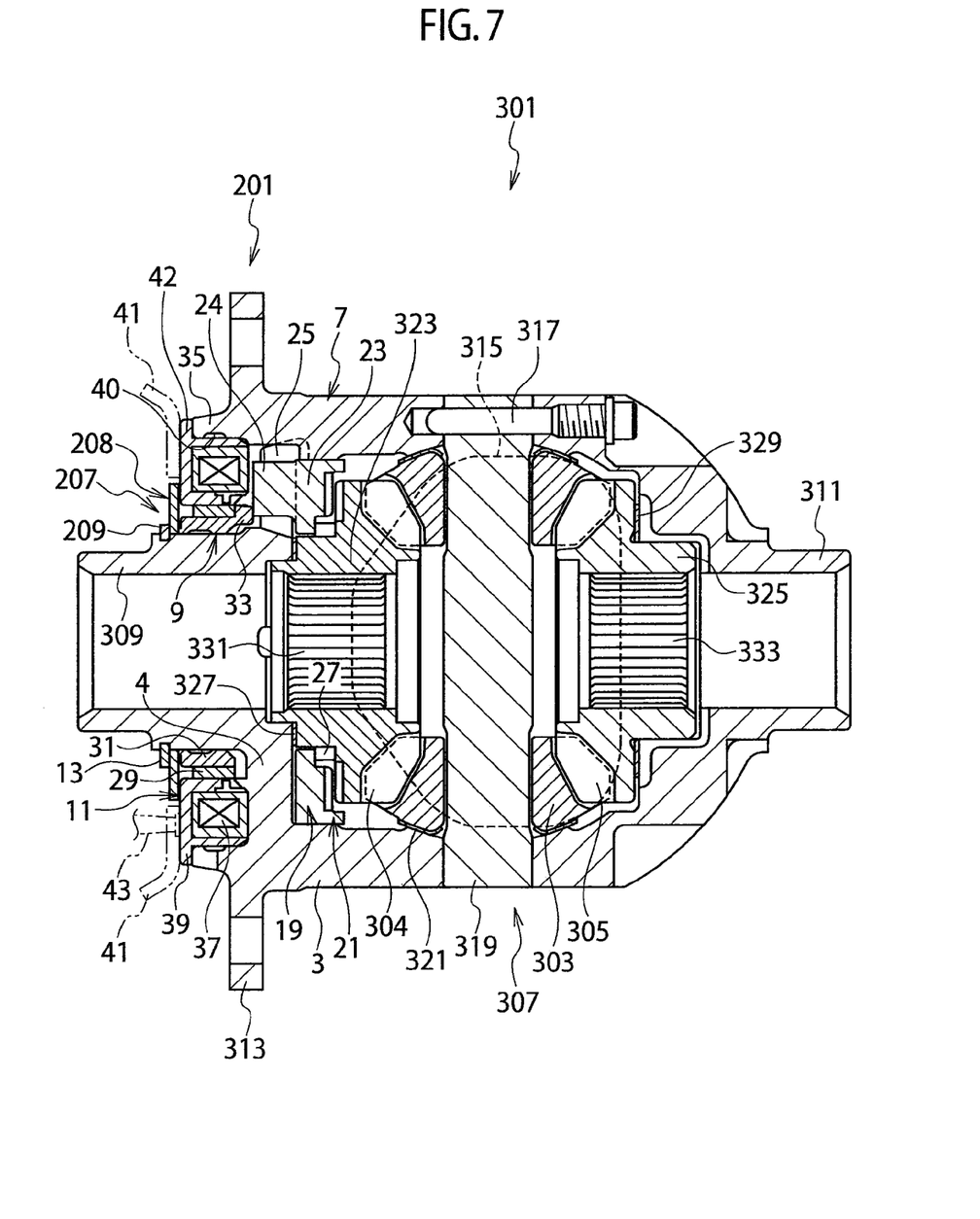
FIG. 7 is an elevational sectional view of a differential device with a clutch device according to a third embodiment of the present invention.
Figure 8:
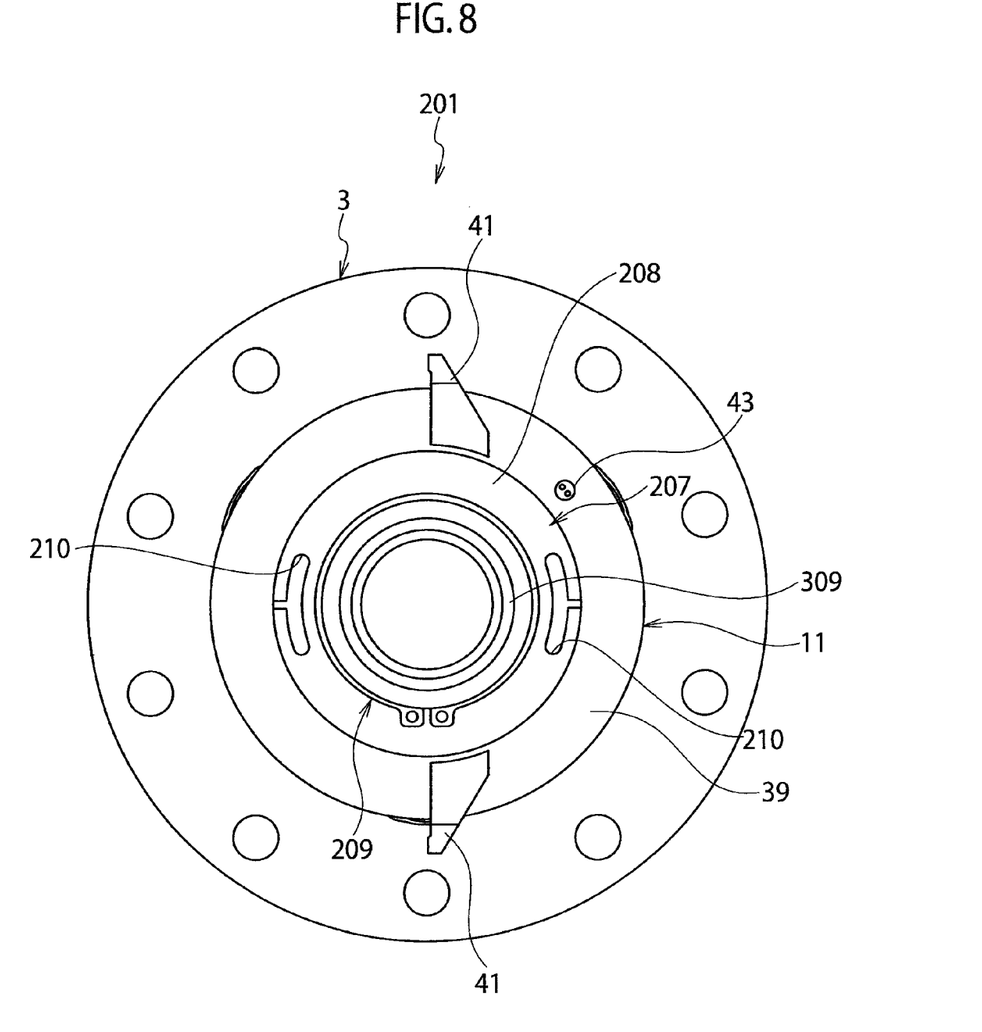
FIG. 8 is a side view of the differential device viewed from the left of FIG. 7.

Referring to FIGS. 7 and 8, the snap ring 209 is snapped into the groove of the boss portion 309 so as to have the plate 208 interposed between the snap ring 209 and the core 39 of the solenoid 11. Then the plunger 31 is disposed at the right relative to the plate 208. Thus the plate 208 of the retainer 207 is in contact with both the plunger 31 at the leftmost position and the solenoid 11, thereby the plunger 31 is barred from going further leftward beyond the leftmost position and the solenoid 11 is axially positioned in place.

As being understood from the above description, the plate 208 is not tightly secured. Therefore the plate 208 can follow rotation of the differential casing 3. This helps smooth rotation of the differential casing 3 even if any of related members sticks to adjacent members.

The clutch device 201 of the third embodiment enjoys the same or similar effects as those of the first embodiment as well as the effects described above.

Fourth Embodiment

Figure 9:
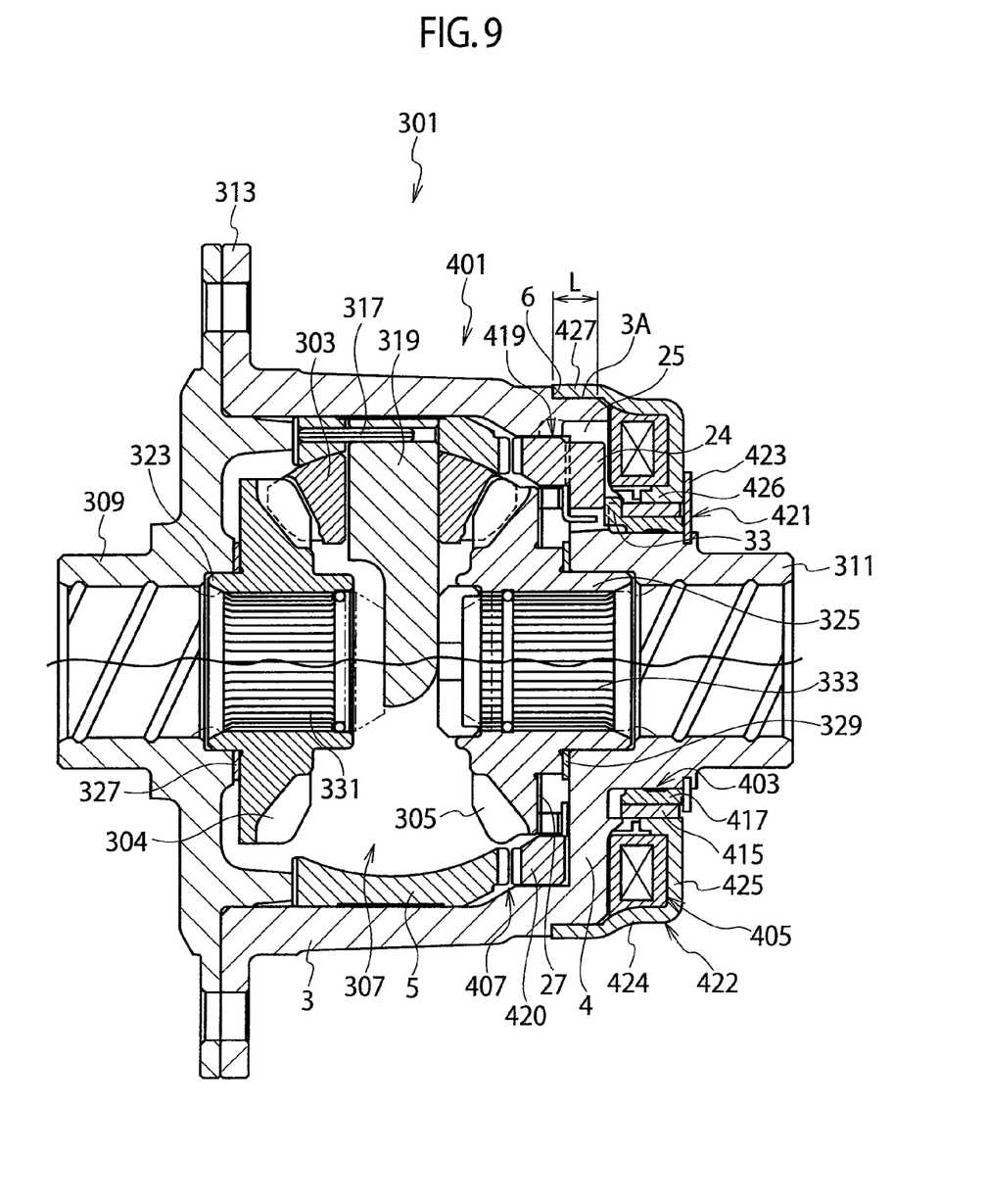
FIG. 9 is an elevational sectional view of a differential device with a clutch device according to a fourth embodiment of the present invention.
Figure 10:
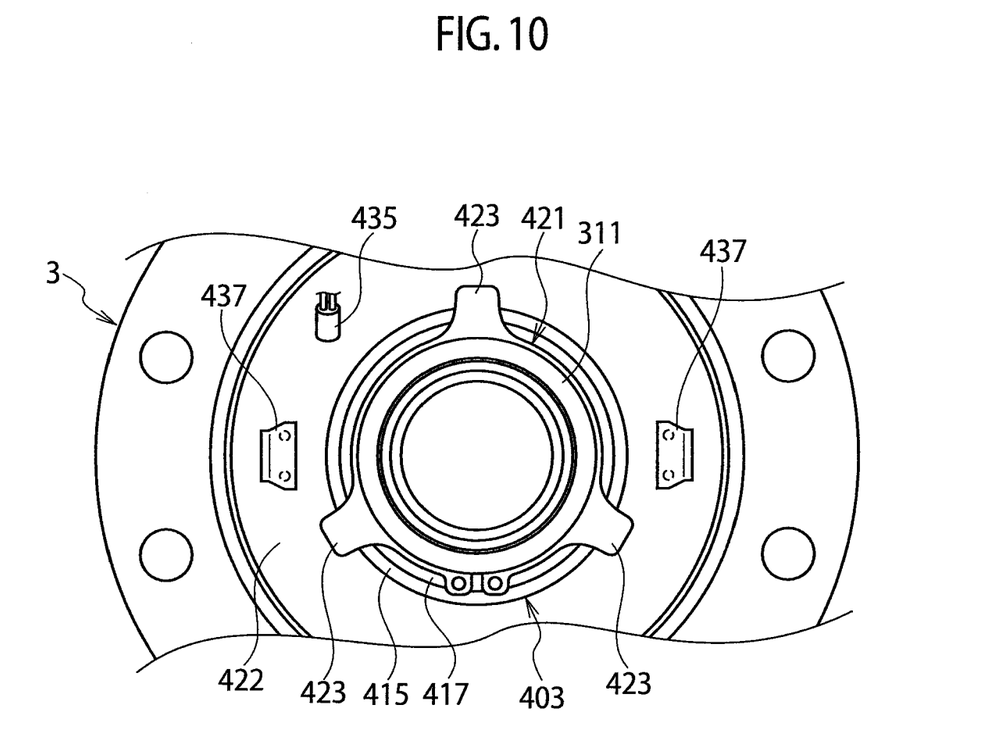
FIG. 10 is a partial side view of the differential device viewed from the right of FIG. 9.

In a fourth embodiment of the present invention as described in FIGS. 9 and 10, a clutch device 401 is combined with a differential device 301 of a free-running type.

The casing of the differential device 301 is separated into an outer casing 3 and an inner casing 5 mutually freely rotatable if not locked by the clutch device 401. The outer casing 3 receives driving force of an engine via a ring gear fixed to the flange portion 313. The differential gear set 307 is housed in and drivingly coupled with the inner casing 5. The clutch device 401, when operated, establishes driving connection between the inner casing 3 and the inner casing 5 so as to transmit torque from the outer casing 3 to the differential gear set 307. A right end of the inner casing 5 is furnished with clutch teeth engageable with clutch teeth of a clutch member 419 to form a clutch 407 of the clutch device 401.

The outer casing 3 may not have a collar for receiving the solenoid 405 unlike the differential casings described above. Other members of the differential device 301 respectively have substantially the same structures as those described above with reference to the same reference numerals.

The clutch device 401 is comprised of the clutch 407 for temporarily coupling the inner casing 5 with the outer casing 3, a movable body 403 with a plunger 417 for actuating the clutch 407, a solenoid 405 for driving the movable body 403, and a retainer 421 secured to the outer casing 3. The retainer 421 is in contact with both the plunger 417 and the solenoid 405, thereby putting these members in place.

The clutch member 419 is slidably housed in the outer casing 3 and thus movable in the axial direction. The clutch member 419 is comprised of a ring-shaped base portion 420 furnished with the teeth and a plurality of projections 24 projecting rightward from the base portion 420. The right end wall 4 of the outer casing 3 correspondingly has openings, through which the projections 24 are exposed to the solenoid 405. The openings of the outer casing 3 and the projections 24 may be formed in an oblique shape so as to function as a cam mechanism to assist engagement of the clutch 407.

A return spring 27 is repulsively interposed between proper members to force the clutch member 419 away from the teeth of the inner casing 5, for example between the clutch member 419 and the right side gear 305.

The solenoid 405 is comprised of a solenoid coil for generating magnetic flux and a magnetic core 422 made of a magnetic material for conducting the generated magnetic flux. The solenoid coil is preferably molded in resin. The magnetic core 422 is comprised of an outer portion 424 for covering the outer side of the coil, an end portion 425 for covering the right end, and an inner portion 426 for covering the inner side. The outer portion 424 may be extended leftward in a shape like as a sleeve so as to slidably fit on the outer casing 3. Preferably, the outer casing 3 is comprised of a radially inwardly stepped engaging surface 3A and a step wall 6 for abutting on the end of the sleeve portion of the core 422. This sleeve portion axially and radially positions the solenoid 405 in place relative to the differential device.

The magnetic core 422 along with the coil is made in contact with the right end wall 4 of the outer casing 3. Thus the magnetic core 422 in combination with the right end wall 4 forms a magnetic circuit but leaves a gap at its radially inner side. Then the sleeve portion of the core 422 fits on the outer casing 3 with an overlapping length L, so the core 422 is radially positioned in place. The length L is preferably made as long as possible in view of stability of positional relation.

The movable body 403 is comprised of the plunger 417 and an armature 415 engaged therewith, both of which have ring-like forms. The movable body 403 is slidably interposed between the solenoid 405 and the boss portion 311 of the outer casing 3 to have the armature 415 spanning the gap left in the magnetic circuit. Thus the magnetic flux generated by the solenoid 405 drives the plunger 417. While the armature 415 is required to be made of a magnetic material, the plunger 417 may be made of a non-magnetic material in view of efficiency of magnetic power.

The plunger 417 is comprised of pressure heads 33 so dimensioned as to abut on the projections 24 of the clutch member 419 through the openings of the end wall 4. Thus the plunger 417 driven by the solenoid 405 moves from the rightmost position to the leftmost position where the plunger 417 forces the clutch 407 into the engaged state.

The right boss portion 311 on its periphery has a circular groove to which the retainer 421 is secured. Referring to FIG. 10, the retainer 421 is a semi-flexible metal member formed in a ring-like shape having open ends, thereby being snapped into the groove of the boss portion 311. Needless to say, the retainer 421 may be formed in a closed ring shape. Then any retaining means such as press-fitting, welding, adhesion, caulking or a snap ring may be used for securing the retainer 421.

The retainer 421 is comprised of a ring-like section and one or more tab sections 423 projecting radially outward from the ring-like section. The ring-like section is made to catch the plunger 417 and the tab sections 423 are made to catch the end portion 425 of the core 422. Thus the retainer 421 secured to the differential device 301 is in contact with both the plunger 417 at the rightmost position and the solenoid 405, thereby the plunger 417 is barred from going further rightward beyond the rightmost position and the solenoid 405 is axially positioned in place.

Anti-rotation members 437 for latching on corresponding members of the automobile body are secured to the end portion 425 of the core 422, thereby the solenoid 405 is anti-rotated. A lead line 435 is led out of the solenoid 405, through which electric power is supplied to the coil under proper control by a controller.

In the absence of excitation of the solenoid 405, the plunger 417 receives repulsive force of the return spring 27 to stay at the rightmost position. When the solenoid 405 is energized, the solenoid 405 drives the plunger 417 to move from the rightmost position to the leftmost position where the plunger 417 forces the clutch 407 into the engaged state. Then the clutch device establishes driving connection between the inner casing 3 and the inner casing 5 so as to transmit torque from the outer casing 3 to the differential gear set 307.

The present fourth embodiment enjoys the same effects as those of the other embodiments. In addition, as the magnetic core 422 has the sleeve portion overlapping the outer surface of the outer casing 3, namely the engaging surface 3A, most of the generated magnetic flux flows through the overlapping portion radially. Thus attraction on the core 422 by the magnetic flux acts mainly in the radial directions, not in the axial direction. Therefore stability of positional relation in the axial direction between the core 422 and the outer casing 3 is assured even if the solenoid 405 is intensely energized.

Fifth Embodiment

Figure 11:
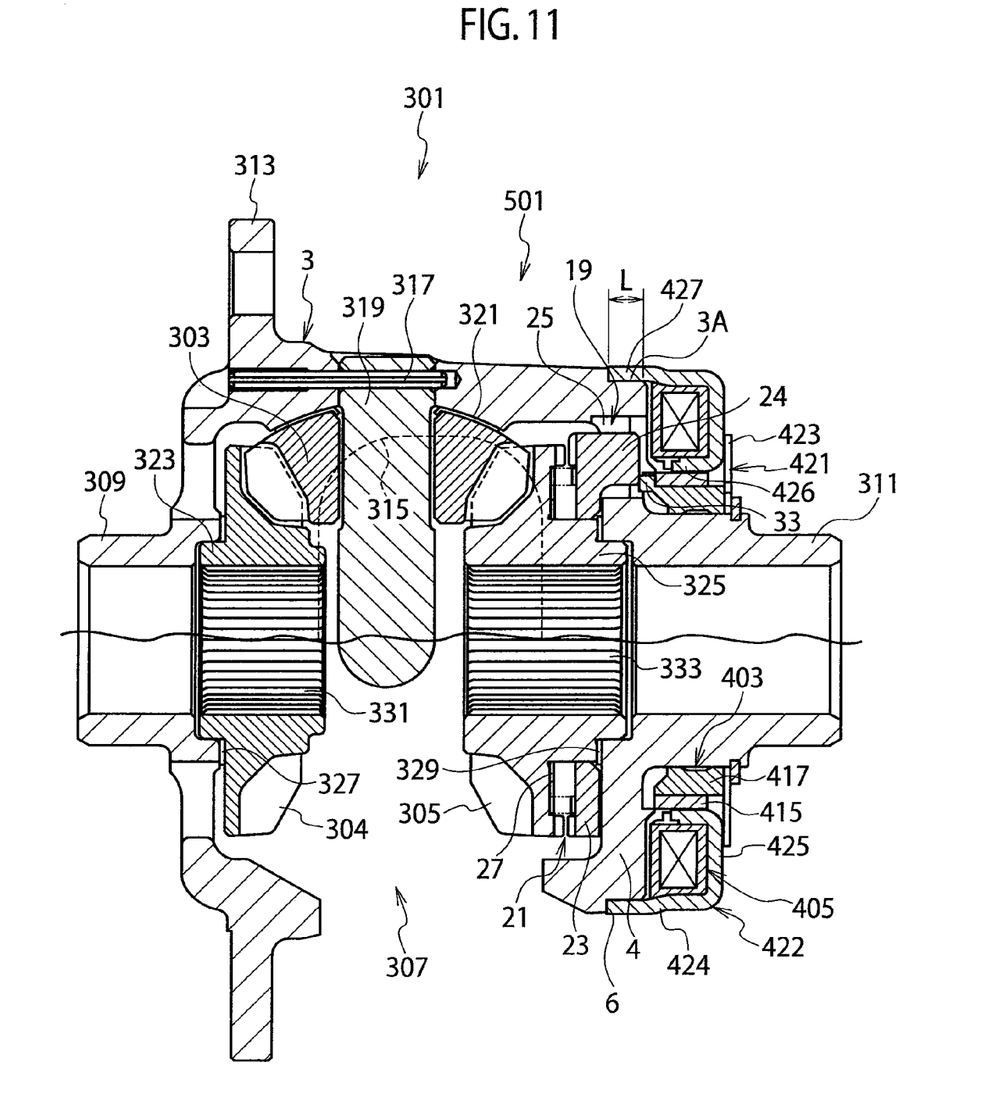
FIG. 11 is an elevational sectional view of a differential device with a clutch device according to a fifth embodiment of the present invention.

In a fifth embodiment described hereinafter with reference to FIG. 11, a clutch device 501 is structured in a way similar to that of the fourth embodiment, however, the clutch device 501 is used in combination with a differential device 301 of a differential-lock type like as the first through third embodiment.

More specifically, a differential gear set 307 is directly coupled with a differential casing 3 by means of pins 317 so that pinion shafts 319 and pinions 303 rotate about the axis in accordance with rotation of the casing 3. Side gears 304 and 305 are engaged with the pinions 303 so that the differential device 301 differentially distribute driving force acting on the casing 3 to a pair of axles via the side gears 304 and 305. The right side gear 305 is furnished with clutch teeth engageable with clutch teeth of a clutch member 19. Thus the clutch can controllably lock differential motion of the differential gear set 307.

The clutch device 501 drives the clutch member 19 so as to temporarily engage the clutch member 19 with the right side gear 305. Other members of the clutch device 501 respectively have substantially the same structures as those of the fourth embodiment described above with reference to the same reference numerals.

The clutch device 501 of the fifth embodiment enjoys the same or similar effects as those of any of the first through fourth embodiments.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A clutch device used in combination with a differential device rotatable about an axis, the clutch device comprising:
    a clutch housed in and rotatable with the differential device and axially movable from a disengaged state into an engaged state;
    a plunger slidably fit on the differential device and being axially movable from a first position where the plunger does not force the clutch to a second position where the plunger forces the clutch into the engaged state;
    an anti-rotated solenoid configured to drive the plunger; and
    a retainer secured with and rotatable along with the differential device and in contact with both the plunger at the first position and the solenoid, whereby the plunger is barred from going beyond the first position and the solenoid is axially positioned in place.

2. The clutch device of claim 1, wherein the retainer comprises one or more radially projecting tab so dimensioned as to be in contact with one selected from the group consisting of the plunger and the solenoid.

3. The clutch device of claim 1, wherein the retainer is formed in a ring-like shape having open ends whereby capable of being snapped into a groove on the differential device.

4. The clutch device of claim 1, wherein the solenoid comprises a core configured to transmit a generated magnetic flux, the core including a sleeve portion slidably fit on the differential device so as to axially and radially position the solenoid relative to the differential device.

5. A clutch device used in combination with a differential device rotatable about an axis, the clutch device comprising:
    a clutch housed in and rotatable with the differential device, the clutch including a first member and a second member engageable with the first member to receive torque from the first member, the first member being axially movable so as to disengageably engage with the second member;
    a plunger slidably fit on the differential device and being axially movable toward the first member;
    an anti-rotated solenoid configured to drive the plunger to force the first member engaged with the second member; and
    a retainer secured with and rotatable along with the differential device and so dimensioned as to have the solenoid positioned in place and bar the plunger from departing away from the solenoid.

6. The clutch device of claim 5, wherein the retainer comprises one or more radially projecting tab so dimensioned as to be in contact with one selected from the group consisting of the plunger and the solenoid.

7. The clutch device of claim 5, wherein the retainer is formed in a ring-like shape having open ends whereby capable of being snapped into a groove on the differential device.

8. The clutch device of claim 5, wherein the solenoid comprises a core configured to transmit a generated magnetic flux, the core including a sleeve portion slidably fit on the differential device so as to axially and radially position the solenoid relative to the differential device.

9. A differential device for differentially distributing a driving force to first and second axles, the differential device comprising:
    a differential gear set configured to allow differential motion between the first and second axles;
    a casing rotatable about an axis, the casing housing and being drivingly coupled with the differential gear set;
    a clutch housed in and rotatable with the casing and axially movable from a disengaged state into an engaged state where the clutch limits the differential motion or transmits torque between the casing and the differential gear set;
    a plunger slidably fit on the differential device and being axially movable from a first position where the plunger does not force the clutch to a second position where the plunger forces the clutch into the engaged state;
    an anti-rotated solenoid configured to drive the plunger; and
    a retainer secured with and rotatable along with the differential device and in contact with both the plunger at the first position and the solenoid, whereby the plunger is barred from going beyond the first position and the solenoid is axially positioned in place.

10. The differential device of claim 9, wherein the retainer comprises one or more radially projecting tab so dimensioned as to be in contact with one selected from the group consisting of the plunger and the solenoid.

11. The differential device of claim 9, wherein the retainer is formed in a ring-like shape having open ends whereby capable of being snapped into a groove on the casing.

12. The differential device of claim 9, wherein the solenoid comprises a core configured to transmit a generated magnetic flux, the core including a sleeve portion slidably fit on the casing so as to axially and radially position the solenoid relative to the casing.

\* \* \* \* \*